US007700063B2

(12) United States Patent  (10) Patent No.: US 7,700,063 B2
Penicaud et al.  (45) Date of Patent: Apr. 20, 2010

(54) METHOD FOR DISSOLVING CARBON NANOTUBES AND THE USE THEREOF

(75) Inventors: Alain Penicaud, Bordeaux (FR); Philippe Poulin, Talence (FR); Alain Derre, Balizac (FR)

(73) Assignee: Centre National de la Recherche Scientifique (C.N.R.S.), Paris Cedex (FR)

( * ) Notice: Subject to any disclaimer, the term of this patent is extended or adjusted under 35 U.S.C. 154(b) by 603 days.

(21) Appl. No.: 10/585,094

(22) PCT Filed: Dec. 24, 2004

(86) PCT No.: PCT/FR2004/003383

§ 371 (c)(1), (2), (4) Date: Jul. 19, 2006

(87) PCT Pub. No.: WO2005/073127

PCT Pub. Date: Aug. 11, 2005

(65) Prior Publication Data

US 2007/0189954 A1  Aug. 16, 2007

(30) Foreign Application Priority Data

Dec. 30, 2003  (FR) .................................. 03 15582

(51) Int. Cl.
 *D01F 9/12* (2006.01)
(52) U.S. Cl. ................. 423/447.1; 423/447.2; 423/448; 423/449.1; 423/460; 423/461; 423/445 B
(58) Field of Classification Search ................... 516/32, 516/38; 117/921; 423/460, 260, 447.1, 445, 423/461, 449
See application file for complete search history.

(56) References Cited

U.S. PATENT DOCUMENTS 5,695,734 A * 12/1997 Ikazaki et al. ............... 423/461
6,187,823 B1  2/2001 Haddon et al.

FOREIGN PATENT DOCUMENTS

WO  02/088025  11/2002

WO  WO 2004046031 A1 * 6/2004

OTHER PUBLICATIONS

Ajayan et al. (Ajayan I) Journal of American Chemical Society (2003), 125, 9258-9259 entitled "Single-step in situ synthesis of polymer-grafted single-wall nanotube composites".*
Zettl et al. Journal of the American Chemical Society (2003) 125, 8, 2062-2063, entitled "Functionalized boron nitride nanotubes with a stannic oxide coating: a novel chemical route to full coverage".*
"Spontaneous dissolution of a single-wall carbon nanotube salt" by Petit et al. published in JACS communications on the web on Dec. 10, 2004.*
"First-principles simulations of endohedral bromine in BC3 nanotubes" by Mintmire et al. published in J. Phys. Chem. B 1998, 102, 1568-1570.*
Feng et al., *Fabrication of Composite Films by Controlling Molecular Doping Processes between Polyaniline and Soluble Multiwalled Nanotubes and Their Optical Characteristics*, Jpn. J. Appl. Phys., vol. 42, No. 9 A, Sep. 2003, pp. 5726-5730, XP001185692.
Ausman et al., *Organic Solvent Dispersions of Single-Walled Carbon Nanotubes: Toward Solutions of Pristine Nanotubes*, Journal of Physical Chemistry, B, Materials, Surfaces, Interfaces and Biophysical, vol. 104, No. 38, Sep. 28, 2002, pp. 8911-8915, XP002206260.
Qiao et al., *Atypical Dependence of Electroosmotic Transport on Surface Charge in a Single-wall Carbon Nanotube*, Nano Letters, American Chem. Soc., vol. 3, No. 8, Aug. 2003, pp. 1013-1017, XP002292244.
Islam et al., *High Weight Fraction Surfactant Solubilization of Single-Wall Carbon Nanotubes in Water*, Nano Letters, vol. 3, No. 2, Feb. 2003, pp. 269-273, XP002344624.
Petit et al., *Tuning and monitoring the electronic structure of carbon nanotubes*, Chemical Physics Letters, vol. 305, No. 5-6, May 28, 1999, pp. 370-374, XP002344623.
Jouguelet et al., *Controlling the electronic properties of single-wall carbon nanotubes by chemical doping*, Chemical Physics Letters, vol. 318, No. 6, Mar. 3, 2000, pp. 561-564, XP002344832.
International Search Report for PCT/FR04/003383 dated Sep. 27, 2005.
Feng et al., *Fabrication of Composite Films by Controlling Molecular Doping Processes between Polyaniline and Soluble Multiwalled Nanotubes and Their Optical Characteristics*, Jpn. J. Appl. Phys., vol. 42, No. 9 A, Sep. 2003, pp. 5726-5730, XP001185692.

(Continued)

*Primary Examiner*—Jerry Lorengo
*Assistant Examiner*—Heng M Chan
(74) *Attorney, Agent, or Firm*—Nixon & Vanderhye P.C.

(57) ABSTRACT

The invention relates to a method for dissolving carbon nanotubes consisting in reducing the nanotubes in such a way that the nanotubes which are negatively charged with positive counter-ions are obtainable. The invention is used, in particular for preparing compounds or carbon nanotubes films.

8 Claims, 1 Drawing Sheet

OTHER PUBLICATIONS

Ausman et al., *Organic Solvent Dispersions of Single-Walled Carbon Nanotubes: Toward Solutions of Pristine Nanotubes*, Journal of Physical Chemistry, B, Materials, Surfaces, Interfaces and Biophysical, vol. 104, No. 38, Sep. 28, 2002, pp. 8911-8915, XP002206260.

Qiao et al., *Atypical Dependence of Electroosmotic Transport on Surface Charge in a Single-wall Carbon Nanotube*, Nano Letters, American Chem. Soc., vol. 3, No. 8, Aug. 2003, pp. 1013-1017, XP002292244.

Islam et al., *High Weight Fraction Surfactant Solubilization of Single-Wall Carbon Nanotubes in Water*, Nano Letters, vol. 3, No. 2, Feb. 2003, pp. 269-273, XP002344624.

Petit et al., *Tuning and monitoring the electronic structure of carbon nanotubes*, Chemical Physics Letters, vol. 305, No. 5-6, May 28, 1999, pp. 370-374, XP002344623.

Jouguelet et al., *Controlling the electronic properties of single-wall carbon nanotubes by chemical doping*, Chemical Physics Letters, vol. 318, No. 6, Mar. 3, 2000, pp. 561-564, XP002344832.

\* cited by examiner

FIGURE UNIQUE
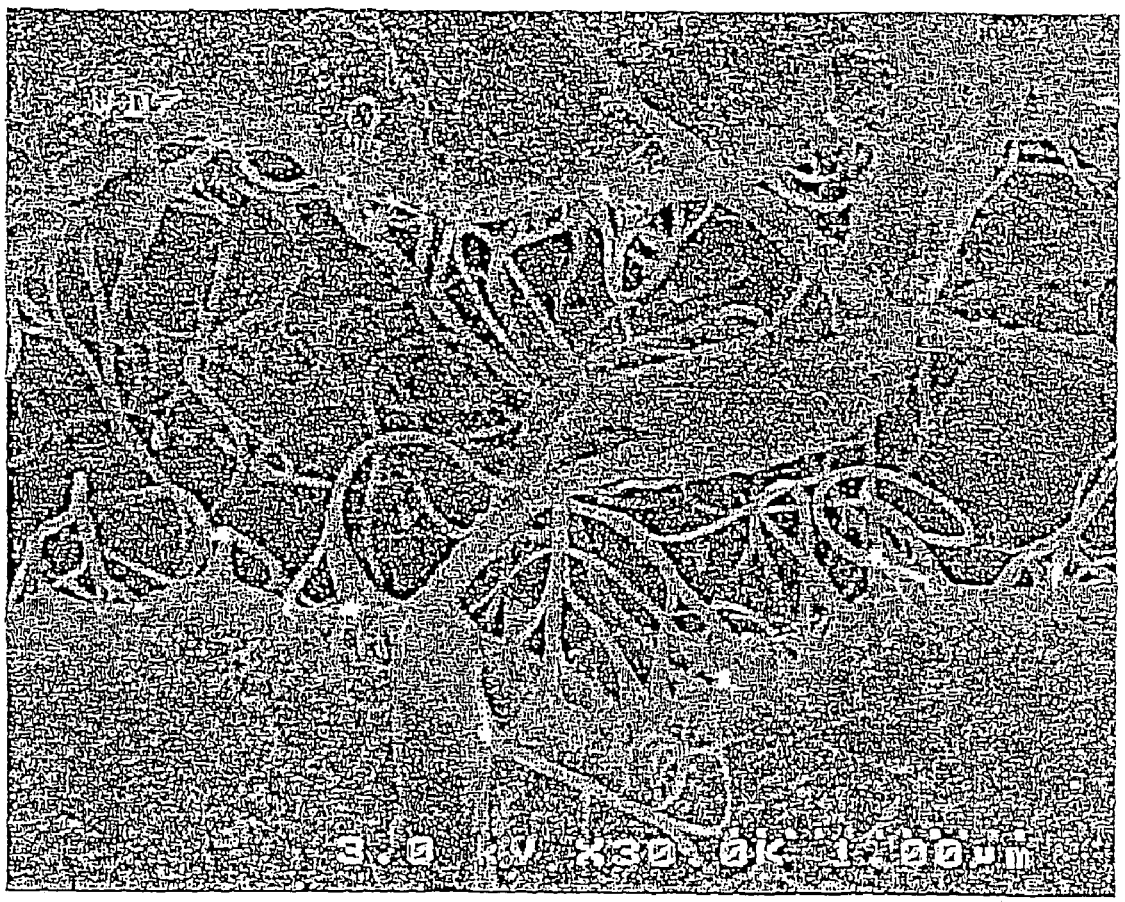

METHOD FOR DISSOLVING CARBON NANOTUBES AND THE USE THEREOF

This application is the US national phase of international application PCT/FR2004/003383 filed 24 Dec. 2004, which designated the U.S. and claims priority to FR 03 15 582 filed 30 Dec. 2003, the entire content of each of which are hereby incorporated by reference.

The subject of the invention is a method of dissolving carbon nanotubes and its applications, especially for the manufacture of composites and the purification of nanotubes.

To obtain nanotubes in the form of solutions is of great benefit for their industrial applications, in particular for forming them for a given use. Such solutions can be readily used to form nanotube films or to produce, by impregnation, composites containing nanotubes. They also open the way to purifying nanotubes.

At the present time, carbon nanotubes are most generally dispersed by the addition of surfactants or polymeric dispersants, and exposed to ultrasound, or by functionalization.

However, these methods have the drawback, respectively, of damaging the nanotubes and of denaturing them.

In the first method, the surfactants cannot easily be desorbed from the surface of the nanotubes, which prevents essential intertube contacts for the exploitation, in particular, of their electronic properties. These solutions must in general be subjected to high doses of ultrasound in order to dissolve the nanotubes, which results in the nanotubes being chopped into shorter, and therefore less anisotropic, fragments, thereby diminishing one fundamental and specific characteristic of carbon nanotubes. As a result, the properties of the nanotubes are impaired. Finally, the systems obtained are metastable from a thermodynamic standpoint and have a tendency to re-aggregate over time.

The second method leads to the formation of functional groups on the surface of the nanotubes and on their ends, hence denaturation which, here again, precludes complete exploitation of the exceptional mechanical, electrical and optical properties of nanotubes.

The work by the inventors was aimed at seeking a method for dissolving nanotubes without using surfactants or polymeric dispersants and ultrasound, and without acid treatments. Thus, it has turned out that these objectives can be achieved by reducing, for example chemically or electrochemically, nanotube specimens.

The object of the invention is therefore to provide a method of dissolving nanotubes that allows their integrity, and hence their properties, to be preserved.

According to the invention, the method of dissolving carbon nanotubes is characterized in that it comprises the reduction of nanotubes, which results in negatively charged nanotubes with positive counterions.

According to a preferred arrangement, the counterions are alkali metal cations.

The invention also relates to a method of dissolving carbon nanotubes that is characterized in that it includes the addition, under anaerobic conditions, to the nanotubes of a salt of formula:

$$A^+B^-$$

in which:

$A^+$ represents a cation of an alkali metal ion, such as lithium or sodium; and $B^-$ represents an anion of a polyaromatic compound, so as to electrically charge the nanotubes, the anion of the polyaromatic compound being a reducing agent for these nanotubes.

The nanotube salt is separated from the medium by filtration and dried. In a second step a polar solvent is added, which results in a dissolved phase with the nanotubes and an undissolved phase. The nanotube solutions are then separated, for example by centrifugation of the solid residue.

It should be noted that this solution treatment, which, as emphasized above, increases the technological options of preparing carbon nanotube devices, results in no denaturation of the nanotubes.

In particular, it will be seen that it is sufficient to place fewer nanotubes in a matrix in order to obtain equivalent or superior properties (e.g. in transparent films) than those obtained with the current techniques, the length of the nanotubes having been maintained.

Advantageously, the polyaromatic compound is chosen from naphthalene, benzophenone, fluorenone and anthraquinone.

Suitable polar organic solvents for implementing the invention comprise sulfolane, dimethyl sulfoxide, dimethylformamide, N-methylpyrrolidone and N-methylformamide.

According to one arrangement of the invention, the nanotubes contain boron as a substitute for carbon.

In one embodiment of the invention, the nanotubes used are single-walled nanotubes.

In another embodiment, the nanotubes are multi-walled nanotubes.

Depending on the envisaged applications, the nanotubes used are empty nanotubes, or else they contain molecules, for example photosensitive molecules or fullerenes, salts, such as alkali metal halides, or else metal elements.

The method of dissolving carbon nanotubes may further include, according to the invention, a step of purifying the nanotubes.

The method may also include a step of functionalizing the surface or the ends of the nanotubes.

Advantageously, the solutions obtained according to the invention are used for impregnating polymers, for manufacturing antistatic plastics, or for mechanical reinforcement, or for electromagnetic shielding, or else they are deposited on substrates in order to form thin, optionally oriented, films with electrooptic properties.

Starting from these solutions, it is possible to purify the nanotubes (for example by crystallization/precipitation, chromatography, electrophoresis, etc.), to obtain nanotube mesophases (liquid crystals), bucky papers and, in general to carry out forming operations resulting in any type of device that exploits the greatly beneficial mechanical, electrical and optical properties of carbon nanotubes.

In particular, these solutions lead to conducting transparent coatings, either by mixing with a polymer soluble in organic solvents, or by mixing with a monomer followed by subsequent polymerization.

Other features and advantages of the invention are given in the examples that follow, with reference to the single figure, which shows an image of the solid matter obtained from a solution of carbon nanotubes in DMSO, taken by a scanning electron microscope.

EXAMPLE 1

Synthesis of a Carbon Nanotube Lithium Salt

The procedure was carried out in a controlled atmosphere (for example in argon). This salt was obtained by reaction of a carbon nanotube suspension in THF in which a naphthalene salt, namely Naph$^-$Li$^+$ (Naph=naphthalene), was dissolved using a method modified from P. Petit et al., Chemical Physics Letters, 1999, 305, 370-374 and E. Jouguelet et al., Chemical Physics Letters, 2000, 318, 561-564.

In particular, the Naph$^-$Li$^+$ salt was prepared by reacting naphthalene with an excess of lithium in THF until a very dark green, almost black, color developed.

This Naph$^-$Li$^+$ solution was then added to raw carbon nanotubes obtained by the electric arc method and left, with stirring, for a few hours. The nanotubes were then filtered and rinsed with THF until all coloration of the latter on contact with the nanotubes disappeared. They were then vacuum-dried at room temperature.

By way of illustration, an example of a synthesis carried out on a laboratory scale is reported: all the handling operations were carried out in a glove box in a dry argon atmosphere (O$_2$ content <5 ppm; H$_2$O content <1 ppm).

320 milligrams of naphthalene were placed in a 250 cc flask to which 30 milligrams of lithium in the form of small pieces of shiny surface (peeled with a scalpel just before use) and then about 100 cc of THF were added. The flask was heated to reflux until the solution turned a very dark green, and left at reflux for a few hours. This solution was then poured, via a filter, in order to avoid an excess of solid lithium, onto 180 milligrams of raw nanotubes (synthesized by the electric arc method). The whole assembly was left with stirring at room temperature for four hours. Alternatively, the reduction in Naph$^-$Li$^+$ concentration could be monitored by UV/visible spectroscopy. This solution was filtered over a membrane of the Millipore® type (0.45 micron pores). The solid was rinsed several times with THF (distilled over a lithium/naphthalene mixture) until the THF remained colorless after passing through the filter. The solid was then vacuum-dried at room temperature. It exhibited good storage stability over at least several months, in a controlled atmosphere.

In another experiment, the procedure was as indicated above but 390 mg of naphthalene, 120 mg of sodium metal and 220 mg of raw nanotubes were used, this all then being stirred for about 15 h.

Preparation of the solutions: Various polar organic solvents (sulfolane, dimethyl sulfoxide, dimethyl formamide, N-methylpyrrolidone, etc.) were added to the doped nanotubes. After a few minutes to a few hours, a more or less dark solution was obtained, the darkness depending on the solubility of the nanotubes in the solvent.

Regeneration of the neutral character of the nanotubes: In order for the nanotubes to be able to be easily handled in the open air for applications not requiring the nanotubes to be electrically charged, their neutral state was restored either by exposing the solution to air, or, in order to speed up the process, by adding water or toluene.

In all these cases, the nanotubes re-aggregated and it was then sufficient to filter the solution in order to recover the insoluble fraction.

Example of solubilization: 40 mg of sodium-doped nanotubes in 16 cc of DMSO were stirred for about 14 h in a controlled atmosphere at room temperature. The solution obtained was centrifuged at 4000 rpm for 1 h and then decanted. A uniform solution of nanotubes was obtained, that is to say one not containing aggregates visible in an optical microscope (×1000 magnification). A solubility of 2 mg of sodium-doped nanotubes per gram of DMSO was obtained.

Example of functionalization: An organic group R was attached to a nanotube by carrying out the reaction:

$$(Li^+)_x NT^{x-} + x(R-Br) \rightarrow NT(R)_x + xLiBr$$

where NT denotes a nanotube and x denotes an integer corresponding to the stoichiometry.

The invention claimed is:

1. A method of dissolving carbon nanotubes comprising
   (i) providing reduced, negatively charged nanotubes with positive counterions by reducing carbon nanotubes; and
   (ii) adding a polar organic solvent to the negatively charged nanotubes of step (i), resulting in a dissolved phase of negatively charged nanotubes with positive counterions in the solvent,
   wherein the carbon nanotubes are single-walled or multi-walled nanotubes.

2. A method of dissolving carbon nanotubes comprising
   (i) providing reduced, negatively charged nanotubes with positive counterions by reducing carbon nanotubes; and
   (ii) adding a polar organic solvent to the negatively charged nanotubes of step (i), resulting in a dissolved phase of negatively charged nanotubes with positive counterions in the solvent,
   wherein the step of providing negatively charged nanotubes comprises adding under anaerobic conditions, a salt of formula:

A$^+$B$^-$ to the carbon nanotubes, wherein
   A$^+$ represents a cation of an alkali metal ion; and
   B$^-$ represents an anion of a polyaromatic compound, so as to electrically charge the nanotubes.

3. The method of claim 2 or claim 1, wherein the carbon nanotubes are hollow nanotubes.

4. The method of claim 2 or claim 1, wherein the carbon nanotubes contain molecules, salts, or metal elements inside their hollow interior.

5. The method of claim 2 or claim 1, further comprising a step of functionalizing the surface or the ends of the nanotubes.

6. The method of claim 2 or claim 1, wherein the polyaromatic compound is chosen from naphthalene, benzophenone, fluorenone and anthraquinone.

7. The method of claim 2 or claim 1, wherein the polar organic solvent is sulfolane, dimethyl sulfoxide, dimethylformamide, N-methylpyrrolidone or N-methylformamide.

8. The method of claim 2 or claim 1, wherein the carbon nanotubes contain boron atoms in place of carbon atoms.

* * * * *